(12) United States Patent
Su et al.

(10) Patent No.: US 8,761,403 B2
(45) Date of Patent: Jun. 24, 2014

(54) METHOD AND SYSTEM OF SECURED DATA STORAGE AND RECOVERY

(75) Inventors: Jin-Chern Su, Hsinchu (TW); Pao-Hsin Chang, Taipei (TW); Yi-Feng Jang, Taipei County (TW); Tien-Chun Tseng, Taipei (TW)

(73) Assignee: EE Solutions, Inc, Hsin Chu (TW)

( * ) Notice: Subject to any disclaimer, the term of this patent is extended or adjusted under 35 U.S.C. 154(b) by 1345 days.

(21) Appl. No.: 12/349,524

(22) Filed: Jan. 7, 2009

(65) Prior Publication Data

US 2010/0100721 A1    Apr. 22, 2010

(30) Foreign Application Priority Data

Oct. 8, 2008   (TW) ................... 97138721 A

(51) Int. Cl.
*H04L 9/08* (2006.01)
(52) U.S. Cl.
CPC ....................... *H04L 9/08* (2013.01)
USPC ............. 380/283; 380/46; 380/259; 380/260; 380/263; 380/277; 380/286; 713/150; 713/189; 713/193; 713/185
(58) Field of Classification Search
CPC ........................................................ H04L 9/08
USPC ........................................................ 380/283
See application file for complete search history.

(56) References Cited

U.S. PATENT DOCUMENTS

| | | | |
|---|---|---|---|
| 2003/0095659 A1* | 5/2003 | Ishihara et al. ................. | 380/46 |
| 2004/0103288 A1* | 5/2004 | Ziv et al. ....................... | 713/185 |
| 2004/0123127 A1* | 6/2004 | Teicher et al. ................. | 713/193 |
| 2004/0236958 A1* | 11/2004 | Teicher et al. ................. | 713/193 |
| 2007/0186268 A1* | 8/2007 | McNeely ....................... | 725/135 |
| 2007/0214369 A1* | 9/2007 | Roberts et al. ................. | 713/192 |
| 2008/0034223 A1* | 2/2008 | Funahashi ....................... | 713/193 |
| 2008/0215720 A1* | 9/2008 | Westin .......................... | 709/224 |
| 2008/0301291 A1* | 12/2008 | Westin .......................... | 709/224 |
| 2009/0276623 A1* | 11/2009 | Jevans et al. .................. | 713/155 |
| 2010/0122323 A1* | 5/2010 | Chou et al. ........................ | 726/5 |

OTHER PUBLICATIONS

Byunghee Lee et al. "Secure Data Deletion for USB Flash Memory", Journal of Information Science and Engineer 27, 933-952 (2011), pp. 933-952.*

Janjae Jeong et al. "Vulnerability Analysis of Secure USB Flash Drives", IEEE, 2007,pp. 61-64.*

* cited by examiner

*Primary Examiner* — Luu Pham
*Assistant Examiner* — Canh Le
(74) *Attorney, Agent, or Firm* — Jianq Chyun IP Office

(57) ABSTRACT

A method and a system of secured data storage and recovery are provided. First, a secured key and an encrypted user password of a storage device are obtained by using a controller of a storage device. Then, the secured key is encrypted by using the encrypted user password to generate a first private key, the encrypted user password is encrypted by using the secured key to generate a second private key, and data to be stored is encrypted by using the secured key. Finally, the encrypted data, the first private key, and the second private key are transmitted to a remote device for storage through a host. Thereby, the security of data storage is enhanced and data recovery mechanism is provided when the storage device is damaged or lost.

69 Claims, 11 Drawing Sheets

METHOD AND SYSTEM OF SECURED DATA STORAGE AND RECOVERY

CROSS-REFERENCE TO RELATED APPLICATION

This application claims the priority benefit of Taiwan application serial no. 97138721, filed on Oct. 8, 2008. The entirety of the above-mentioned patent application is hereby incorporated by reference herein and made a part of specification.

BACKGROUND OF THE INVENTION

1. Field of the Invention

The present invention generally relates to a method and a system of data storage and recovery, and more particularly, to a method and a system of secured data storage and recovery for a portable storage device.

2. Description of Related Art

Along with the advancement of semiconductor techniques, the capacities of memories have been increased drastically, too. Flash memory is one of the most adaptable memories for portable products (for example, memory cards or U-disks) due to its characteristics such as data non-volatility, low power consumption, small volume, and non-mechanical structure. In recent years, a solid state drive (SSD) which uses a NAND flash memory as its storage medium has been developed. In a SSD, the mechanical structure of a conventional storage device is replaced with the characteristics of a flash memory, in which data is written and erased in unit of blocks so that the access efficiency of the storage device can be greatly improved. Compared to a conventional storage device, a SSD offers lower power consumption, higher vibration proofness, high stability, and high resistance to low temperature, etc.

Memory cards, U-disks, and SSDs have been broadly used for storing personal data thanks to their small volumes, large capacities, and high portability. However, if such a storage device is lost or stolen, the data stored therein may be misappropriated. To resolve this problem, a secured area is usually disposed in such a storage device and a password is stored in the secured area. When a user connects the storage device to a host, the user has to input a password into the host in order to be authorized to access data stored in the secured area. An authentication program compares the input password with the password stored in the storage device. If the two do not match each other, the host can only access the non-secured portion of the storage device but cannot read the data in the secured area. As a result, the data in the secured area can be protected.

However, in the password authentication method described above, the password in the storage device has to be read into the host to be compared with the password input by the user. Thus, the password in the storage device may be cracked. In addition, if the user loses the storage device, the data stored therein is also lost. Thereby, data security storage method which can increase data security and provide a secured data recovery mechanism is desired.

SUMMARY OF THE INVENTION

Accordingly, the present invention is directed to a secured data storage and recovery method, in which data is encrypted by using a secured key, and the secured key and a user password are crossly encrypted and then stored into a remote device together with the encrypted data, so that the security of data storage is enhanced.

The present invention is directed to a secured data storage and recovery method, in which an encrypted data is stored into a host together with a key and a user password which are crossly encrypted, so that the encrypted data, the key, and the user password can be recovered back into the storage device when it is necessary.

The present invention is directed to a secured data storage and recovery method, in which an encrypted data is stored into a storage device together with a key and a user password which are crossly encrypted, so that data in the storage device can be prevented from being misappropriated.

The present invention is directed to a secured data storage and recovery system, in which a secured key and a user password are crossly encrypted by a controller of a storage device or a host, and then the encrypted secured key and the encrypted user password are transmitted to a remote device together with an encrypted data through the host, so that a secured data storage and recovery function can be accomplished.

The present invention provides a secured data storage and recovery method, in which data is encrypted by using a controller of a storage device and is then transmitted to a remote device through a host. First, a secured key and an encrypted user password of the storage device are obtained by using the controller. Then, the secured key is encrypted by using the encrypted user password to generate a first private key, and the encrypted user password is encrypted by using the secured key to generate a second private key, and the data to be stored is encrypted by using the secured key. Eventually, the encrypted data, the first private key, and the second private key are transmitted to the remote device for storage through the host.

According to an embodiment of the present invention, the encrypted user password obtained by the controller is generated by one of the host and the remote device encrypting an original password with a hash function, in which the original password is a default password of the storage device or a password set by a user.

According to an embodiment of the present invention, the step of obtaining the secured key of the storage device includes obtaining a secured key randomly generated by the host through symmetric encryption by using the host.

According to an embodiment of the present invention, the step of transmitting the encrypted data, the first private key, and the second private key to the remote device for storage further includes encrypting the encrypted data, the first private key, and the second private key by using a public key.

According to an embodiment of the present invention, after the step of encrypting the data by using the secured key, the secured data storage and recovery method further includes storing the encrypted data, the first private key, and the second private key into a secured area of the storage device.

According to an embodiment of the present invention, after the step of storing the encrypted data, the first private key, and the second private key into the secured area of the storage device, the secured data storage and recovery method further includes: receiving a old password and a new password input by a user through the host; encrypting the old password and the new password with a hash function and transmitting the encrypted old password and new password to the controller through the host; reading the first private key and decrypting the first private key by using the encrypted old password to restore the secured key through the controller; reading the second private key and decrypting the second private key by using the secured key to restore the encrypted user password through the controller; determining whether the encrypted old password matches the encrypted user password through the controller; and replacing the encrypted user password with the encrypted new password to encrypt the secured key through the controller if the encrypted old password matches the encrypted user password.

According to an embodiment of the present invention, the step of replacing the encrypted user password with the encrypted new password to encrypt the secured key includes: encrypting the secured key by using the encrypted new password to generate a new first private key; encrypting the encrypted new password by using the secured key to generate a new second private key; and transmitting the new first private key and the new second private key to the remote device through the host.

According to an embodiment of the present invention, after the step of generating the new first private key and the new second private key, the secured data storage and recovery method further includes storing the new first private key and the new second private key into the secured area of the storage device.

According to an embodiment of the present invention, after the step of storing the encrypted data, the first private key, and the second private key into the secured area of the storage device, the secured data storage and recovery method further includes: receiving an input password input by a user through the host; encrypting the input password with a hash function and transmitting the encrypted input password to the controller; reading the first private key and decrypting the first private key by using the encrypted input password to restore the secured key through the controller; reading the second private key and decrypting the second private key by using the secured key to restore the encrypted user password through the controller; determining whether the encrypted input password matches the encrypted user password through the controller; and authorizing the host to access data in the secured area of the storage device or the remote device through the controller if the encrypted input password matches the encrypted user password.

According to an embodiment of the present invention, the controller reads the first private key and the second private key from the secured area of the storage device or from the remote device.

According to an embodiment of the present invention, the secured data storage and recovery method further includes encrypting an exclusive device ID of the host with a hash function through the host to obtain an encrypted device ID and transmitting the encrypted device ID to the storage device. Before the step of receiving the input password input by the user through the host, the secured data storage and recovery method further includes: obtaining the encrypted device ID from the storage device; and decrypting the encrypted device ID and comparing the device ID with the device ID of the host through the host or the storage device, and allowing the host to receive the input password input by the user when the device ID matches the device ID of the host.

According to an embodiment of the present invention, after the step of authorizing the host to access the data in the secured area, the secured data storage and recovery method further includes reading a device file allocation table (FAT) from the secured area of the storage device through the host and decrypting the device FAT by using the secured key through the controller; reading a server FAT from the remote device through the host and decrypting the server FAT by using the secured key through the controller; determining whether the decrypted device FAT matches the decrypted server FAT through the host; and synchronizing data in the remote device and data in the secured area of the storage device through the host if the decrypted device FAT does not match the decrypted server FAT.

According to an embodiment of the present invention, the step of synchronizing data in the remote device and data in the storage device through the host further includes encrypting the transmitted data by using a public key.

According to an embodiment of the present invention, the step of synchronizing data in the remote device and data in the storage device through the host includes copying the data in the remote device to the storage device or copying the data in the storage device to the remote device.

According to an embodiment of the present invention, the step of synchronizing data in the remote device and data in the storage device through the host includes copying the first private key and the second private key to the remote device or to the secured area of the storage device.

According to an embodiment of the present invention, the secured data storage and recovery method further includes: obtaining a system password of the storage device through the host; encrypting the system password with a hash function and transmitting the encrypted system password to the controller through the host; encrypting the secured key by using the encrypted system password to generate a third private key through the controller; encrypting the encrypted system password by using the secured key to generate a fourth private key through the controller; and storing the third private key and the fourth private key into the secured area of the storage device. The encrypted system password is further used for encrypting the encrypted user password.

According to an embodiment of the present invention, after the step of storing the third private key and the fourth private key into the secured area of the storage device through the controller, the secured data storage and recovery method further includes receiving an input password input by a user through the host; encrypting the input password with a hash function and transmitting the encrypted input password to the controller through the host; reading the third private key and decrypting the third private key by using the encrypted input password to restore the secured key through the controller; reading the fourth private key and decrypting the fourth private key by using the secured key to restore the encrypted system password through the controller; determining whether the encrypted input password matches the encrypted system password through the controller; and authorizing the host to access data in the secured area if the encrypted input password matches the encrypted system password.

According to an embodiment of the present invention, the system password includes an ID or a PIN unlock key (PUK) of the storage device.

The present invention provides a secured data storage and recovery method, in which data is encrypted by using a controller of a storage device, and the encrypted data is stored into a host. First, a secured key and an encrypted user password of the storage device are obtained by using the controller. Then, the secured key is encrypted by using the encrypted user password to generate a first private key, the encrypted user password is encrypted by using the secured key to generate a second private key, and the data to be stored is encrypted by using the secured key. Eventually, the encrypted data, the first private key, and the second private key are stored into the host.

The present invention provides a secured data storage and recovery method, in which data is encrypted by using a controller of a storage device, and the encrypted data is transmitted to a remote device through a host. First, a secured key and an encrypted user password of the storage device are obtained by using the controller. Then, the secured key is encrypted by using the encrypted user password to generate a first private key, the encrypted user password is encrypted by using the secured key to generate a second private key, and the data to be stored is encrypted by using the secured key. Eventually, the encrypted data, the first private key, and the second private key are stored into a secured area of the storage device.

The present invention provides a secured data storage and recovery system including a remote device, a host, and a storage device. The host is connected to the remote device via a network, and the host encrypts an original password with a hash function to generate an encrypted user password. The storage device is connected to the host and includes a controller and a storage unit. The controller receives an encrypted user password through the host and obtains a secured key. The controller encrypts the secured key by using the encrypted user password to generate a first private key, encrypts the encrypted user password by using the secured key to generate a second private key, and encrypts data to be stored by using the secured key. The controller transmits the encrypted data, the first private key, and the second private key to the remote device through the host. The storage unit stores the encrypted data, the first private key, and the second private key.

According to an embodiment of the present invention, the host randomly generates the secured key through symmetric encryption.

According to an embodiment of the present invention, the step of transmitting the encrypted data, the first private key, and the second private key to the remote device through the host further includes encrypting the encrypted data, the first private key, and the second private key by using a public key.

According to an embodiment of the present invention, the host further receives an old password and a new password input by a user, encrypts the old password and the new password with a hash function, and transmits the encrypted old password and the encrypted new password to the controller. The controller reads the first private key and decrypts the first private key by using the encrypted old password to restore the secured key, and the controller reads the second private key and decrypts the second private key by using the secured key to restore the encrypted user password. The controller then determines whether the encrypted old password matches the encrypted user password, and the controller replaces the encrypted user password with the encrypted new password to encrypt the secured key when the encrypted old password matches the encrypted user password.

According to an embodiment of the present invention, the controller encrypts the secured key by using the encrypted new password to generate a new first private key, encrypts the encrypted new password by using the secured key to generate a new second private key, and transmits the new first private key and the new second private key to the remote device through the host. In addition, the controller stores the new first private key and the new second private key into the storage unit.

According to an embodiment of the present invention, the host further receives an input password input by a user, encrypts the input password with a hash function, and transmits the encrypted input password to the controller. The controller further reads the first private key and decrypts the first private key by using the encrypted input password to restore the secured key, and the controller reads the second private key and decrypts the second private key by using the secured key to restore the encrypted user password. The controller then determines whether the encrypted input password matches the encrypted user password, and the controller authorizes the host to access data in the storage unit of the storage device or data in the remote device when the encrypted input password matches the encrypted user password. The controller reads the first private key and the second private key from the storage unit of the storage device or from the remote device.

According to an embodiment of the present invention, after being authorized to access data in the storage unit, the host reads a device FAT from the storage unit of the storage device and decrypts the device FAT by using the secured key through the controller, and the host reads a server FAT from the remote device and decrypts the server FAT by using the secured key through the controller. The host then determines whether the decrypted device FAT matches the decrypted server FAT, and the host synchronizes data in the remote device and data in the storage unit of the storage device when the decrypted device FAT does not match the decrypted server FAT.

According to an embodiment of the present invention, when the host synchronizes data in the remote device and data in the storage device, the host further encrypts the transmitted data by using a public key. In addition, when the host synchronizes data in the remote device and data in the storage device, the host copies data from the remote device to the storage device or copies data from the storage device to the remote device, and the host further copies the first private key and the second private key to the remote device or to the storage unit of the storage device.

According to an embodiment of the present invention, the host further obtains a system password of the storage device, encrypts the system password with a hash function, and transmits the encrypted system password to the controller. The controller further encrypts the secured key by using the encrypted system password to generate a third private key and encrypts the encrypted system password by using the secured key to generate a fourth private key, and the controller stores the third private key and the fourth private key into the storage unit of the storage device. In addition, the controller further encrypts the encrypted user password by using the encrypted system password. The system password includes an ID or a PUK of the storage device.

According to an embodiment of the present invention, the controller further reads the third private key and decrypts the third private key by using the encrypted input password to restore the secured key, and reads the fourth private key and decrypts the fourth private key by using the secured key to restore the encrypted system password. The controller then determines whether the encrypted input password matches the encrypted system password, and the controller authorizes the host to access data in the storage unit when the encrypted input password matches the encrypted system password.

According to an embodiment of the present invention, the storage device is a U-disk, a NAND flash memory, a NOR flash memory, a solid state drive (SSD), or a hard disk drive (HDD).

According to an embodiment of the present invention, the host is a laptop, a desktop, a personal digital assistant (PDA), or a kernel-based virtual machine (KVM).

In the present invention, a secured key and a user password are crossly encrypted, and data to be stored is encrypted by using the secured key and is respectively stored into a remote device, a host, and a secured area of a storage device together with the crossly encrypted secured key and user password. When a user is about to update the user password, access data, or recover data, the secured key and user password stored in foregoing devices are decrypted and compared with a password input by the user, and the user is authorized to access the data only when the user passes the authentication. Thereby, the security in data storage and recovery is enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
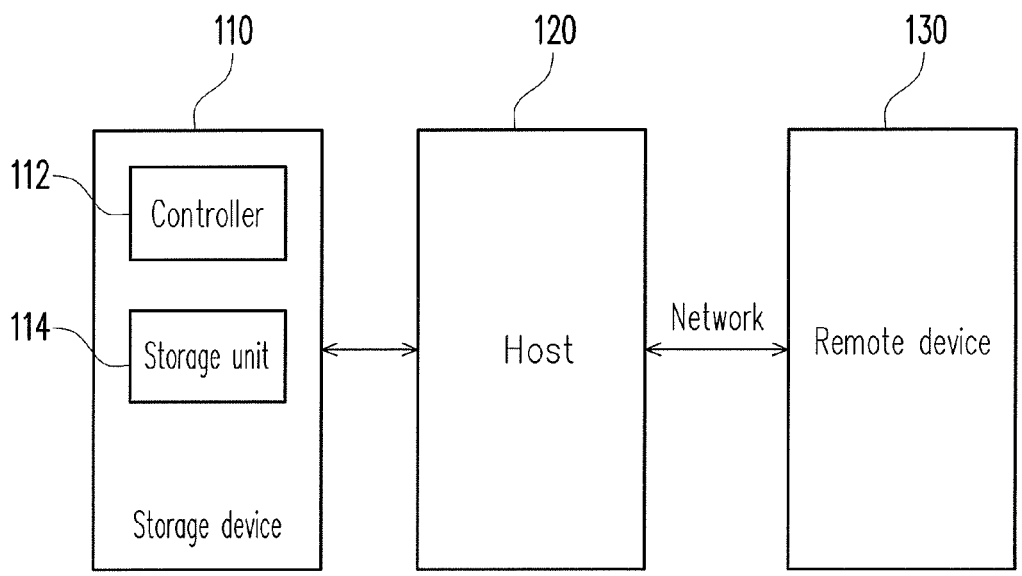
FIG. 1 is a block diagram of a secured data storage and recovery system according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, in order to prevent personal data from being lost or misappropriated, the data is encrypted by using a secured key, and the secured key and a user password are crossly encrypted and stored into a remote device, a host, or a storage device together with the encrypted data. Accordingly, if any one of foregoing devices is damaged or lost, the data can be recovered from one of the other devices. As a result, the risk of data loss is reduced, and the security of data storage is enhanced by adopting cross encryption mechanism between the secured key and the user password. The present invention provides a method and a system of secured data storage and recovery based on foregoing concept. Embodiments of the present invention will be described below with reference to accompanying drawings.

First Embodiment

FIG. 1 is a block diagram of a secured data storage and recovery system according to the first embodiment of the present invention. Referring to FIG. 1, in the present embodiment, the secured data storage and recovery system 100 encrypts data by using a controller 112 of a storage device 110 and transmits the encrypted data to a remote device 130 through a host 120 or stores the encrypted data into the host 120 or into a storage unit 114 of the storage device 110. According to the present invention, when data in the storage device 110 is lost, the data can be recovered from the remote device 130 back into the storage device 110 through data synchronization and recovery mechanism between the storage device 110, the host 120, and the remote device 130.

The host 120 may be a laptop, a desktop, or a personal digital assistant (PDA). The storage device 110 may be an external storage device, such as a U-disk, a NAND flash memory, a NOR flash memory, or a solid state drive (SSD), connected to the host 120 through a universal serial bus (USB) or a hard disk drive (HDD) connected to the host 120 through a bus.

The host 120 may store the encrypted data directly into the storage device 110 or in the host 120 itself, or, the host 120 may also be connected to the remote device 130 via a network and transmit the encrypted data to the remote device 130 through the network. When the storage device 110 is manufactured, the host 120 generates a key and a password for the storage device 110. When the storage device 110 is accessed, the host 120 allows a user to input a password and determines whether to authorize the user to update a user password or to access data in the storage device 110. When the data in the storage device 110 is recovered, the host 120 recovers the backup data stored from the remote device 130 or from itself back to the storage device 110. The present invention provides different password generation, password updating, data access, data synchronization, and data recovery methods corresponding to different destinations of data storage and different application stages of the storage device 110, and these methods will be respectively described in detail with reference to embodiments of the present invention.

Second Embodiment

Figure 2:
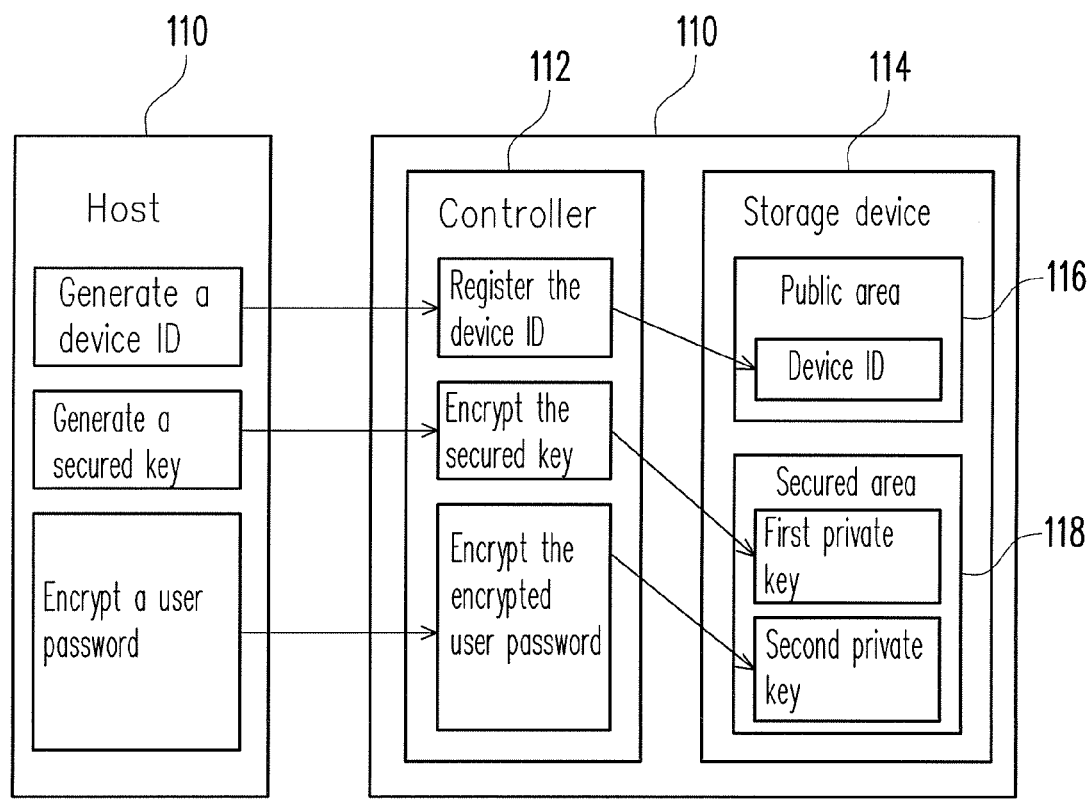
FIG. 2 is a diagram of a secured data storage method according to a second embodiment of the present invention.
Figure 3:
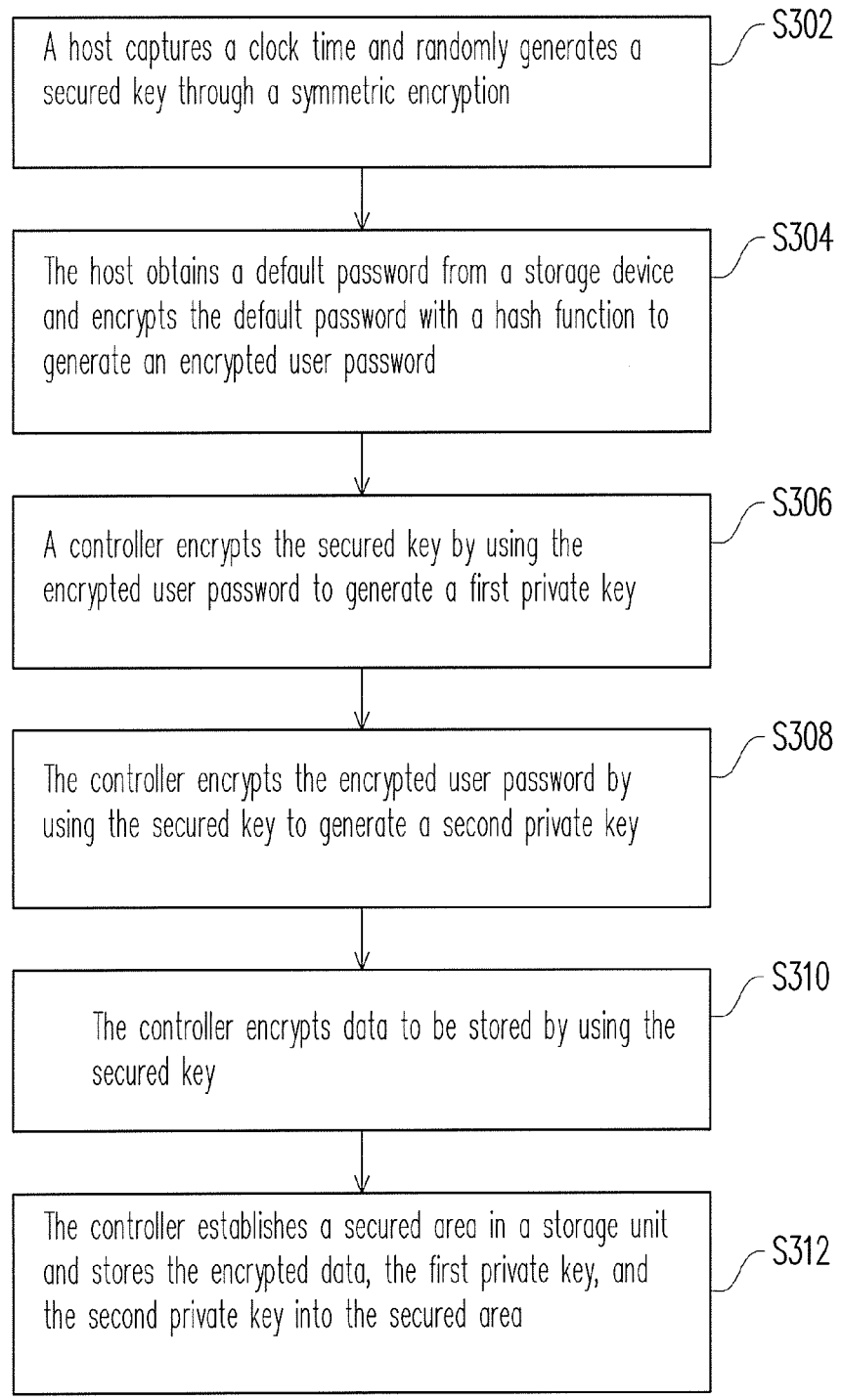
FIG. 3 is a flowchart of a secured data storage method according to the second embodiment of the present invention.

In the second embodiment, the encrypted data and the crossly encrypted key and password are stored into the storage device so that when a user is about to access the data, the identification of the user is identified and accordingly the security in data storage is enhanced. FIG. 2 is a diagram of a secured data storage method according to the second embodiment of the present invention. FIG. 3 is a flowchart of the secured data storage method according to the second embodiment of the present invention. Referring to both FIG. 2 and FIG. 3, in the present embodiment, when the storage device 110 is manufactured, a secured key and a default password of the storage device 110 are crossly encrypted through a cross encryption mechanism so that the security of the key and the password is enhanced and the key and the password are prevented from being cracked or stolen by unauthorized users. Steps of the secured data storage method will be described in detail below.

First, the host 120 captures a clock time and randomly generates a secured key through a symmetric encryption, such as an advanced encryption standard (AES) algorithm (step S302), and then transmits the secured key to the controller 112. On the other hand, the host 120 also obtains a default password from the storage device 110 and encrypts the default password with a hash function to generate an encrypted user password (step S304), and then transmits the encrypted user password to the controller 112.

After the controller 112 receives the encrypted user password and the secured key from the host 120, the controller 112 encrypts the secured key by using the encrypted user password to generate a first private key (step S306), and meanwhile, the controller 112 encrypts the encrypted user password by using the secured key to generate a second private key (step S308).

In addition, the controller 112 further encrypts the data to be stored by using the secured key (step S310) and establishes a secured area 118 in the storage unit 114. The controller 112 then stores the encrypted data, the first private key, and the second private key into the secured area 118 (step S312).

It should be mentioned that the host 120 further sets the captured clock time as a device ID for identifying the storage device 110 and writes the device ID into a public area 116 of the storage unit 114 through the controller 112.

Through the method described above, besides the encrypted data, the first private key and second private key are also stored in the storage device 110 so that when subsequently a user is about to access the encrypted data, whether to authorize the user to access the data can be determined by reading and decrypting the first private key and the second private key and comparing them with a password input by the user. As a result, the security of the data stored in the storage device 110 is enhanced.

Figure 4:
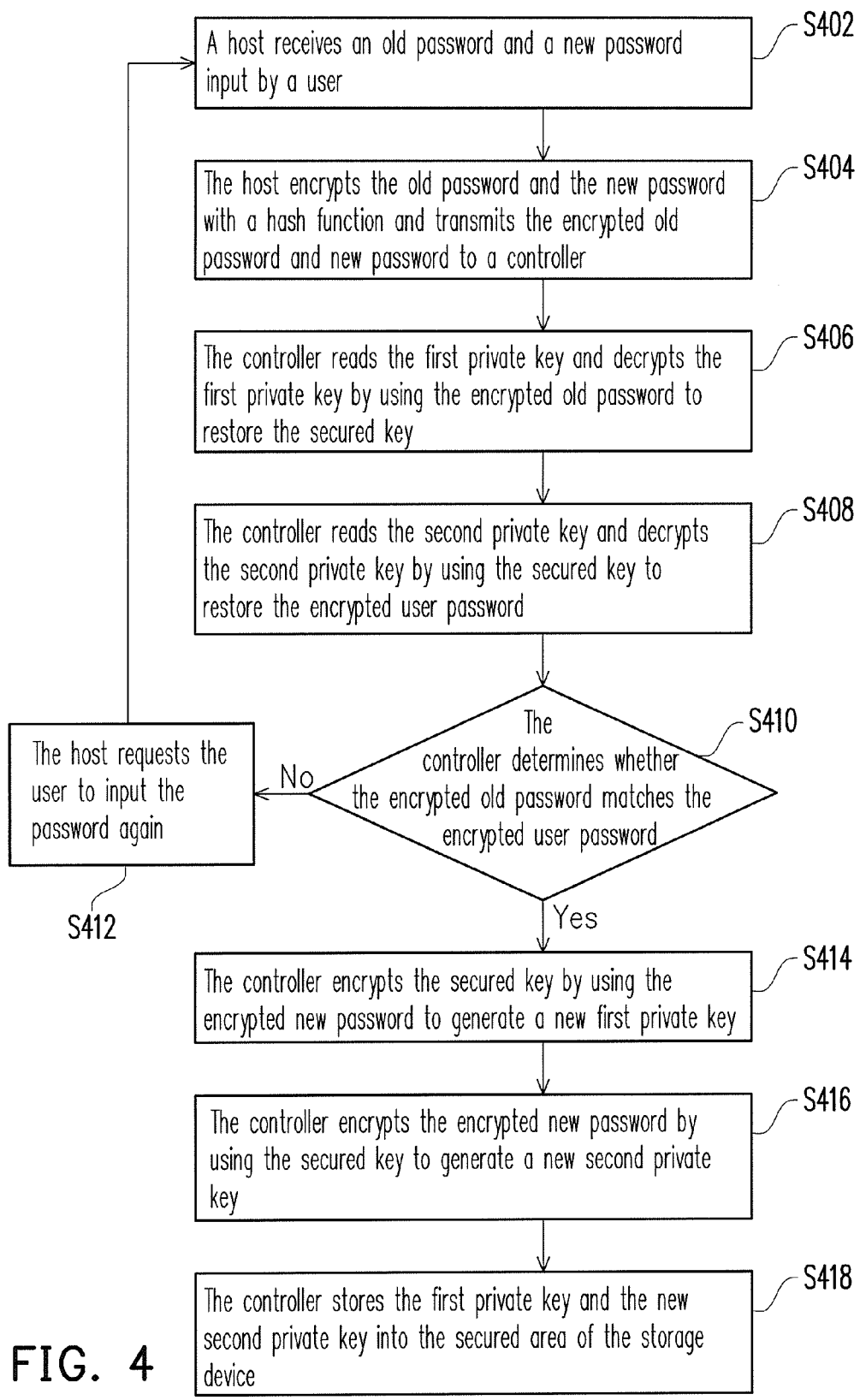
FIG. 4 is a flowchart of a password updating method according to the second embodiment of the present invention.

According to an embodiment of the present invention, if the user is about to update a user password, the user has to provide an old password to the system, and after the system authenticates the old password, the system replaces the old password with a new password to encrypt the secured key. FIG. 4 is a flowchart of a password updating method according to the second embodiment of the present invention. Referring to FIG. 4, in the present embodiment, when a user is about to update his password for accessing the storage device, the secured key and the user password of the storage device are restored through a cross decryption mechanism, and the decrypted user password is compared with the password input by the user to determine whether to update the user's password. Steps of the password updating method will be described in detail below.

First, the host receives an old password and a new password input by the user (step S402), and the host encrypts the old password and the new password with a hash function and transmits the encrypted old password and new password to the controller (step S404).

Next, the controller reads the first private key from the secured area of the storage device and decrypts the first private key by using the encrypted old password to restore the secured key (step S406). On the other hand, the controller also reads the second private key and decrypts the second private key by using the decrypted secured key to restore the encrypted user password (step S408).

Thereafter, the controller compares the encrypted old password with the encrypted user password to determine whether the encrypted old password matches the encrypted user password (step S410). If the encrypted old password does not match the encrypted user password, the host requests the user to input the password again (step S412) and the process returns to step S402. If the encrypted old password matches the encrypted user password, the host replaces the encrypted user password with the encrypted new password to encrypt the secured key. To be specific, the controller encrypts the secured key by using the encrypted new password to generate a new first private key (step S414) and encrypts the encrypted new password by using the secured key to generate a new second private key (step S416). After that, the host stores the first private key and the second private key into the secured area of the storage device (step S418).

It should be mentioned herein that the user may input the old password and the new password together to be authenticated by the host, or the user may also input the old password first to be authenticated by the host and then input the new password to update the password. The input pattern of the old password and the new password is not limited in the present embodiment. Through the method described above, whether the password input by the user is correct can be authenticated by using the first private key and the second private key stored in the storage device, and accordingly the user password can be updated.

Figure 5:
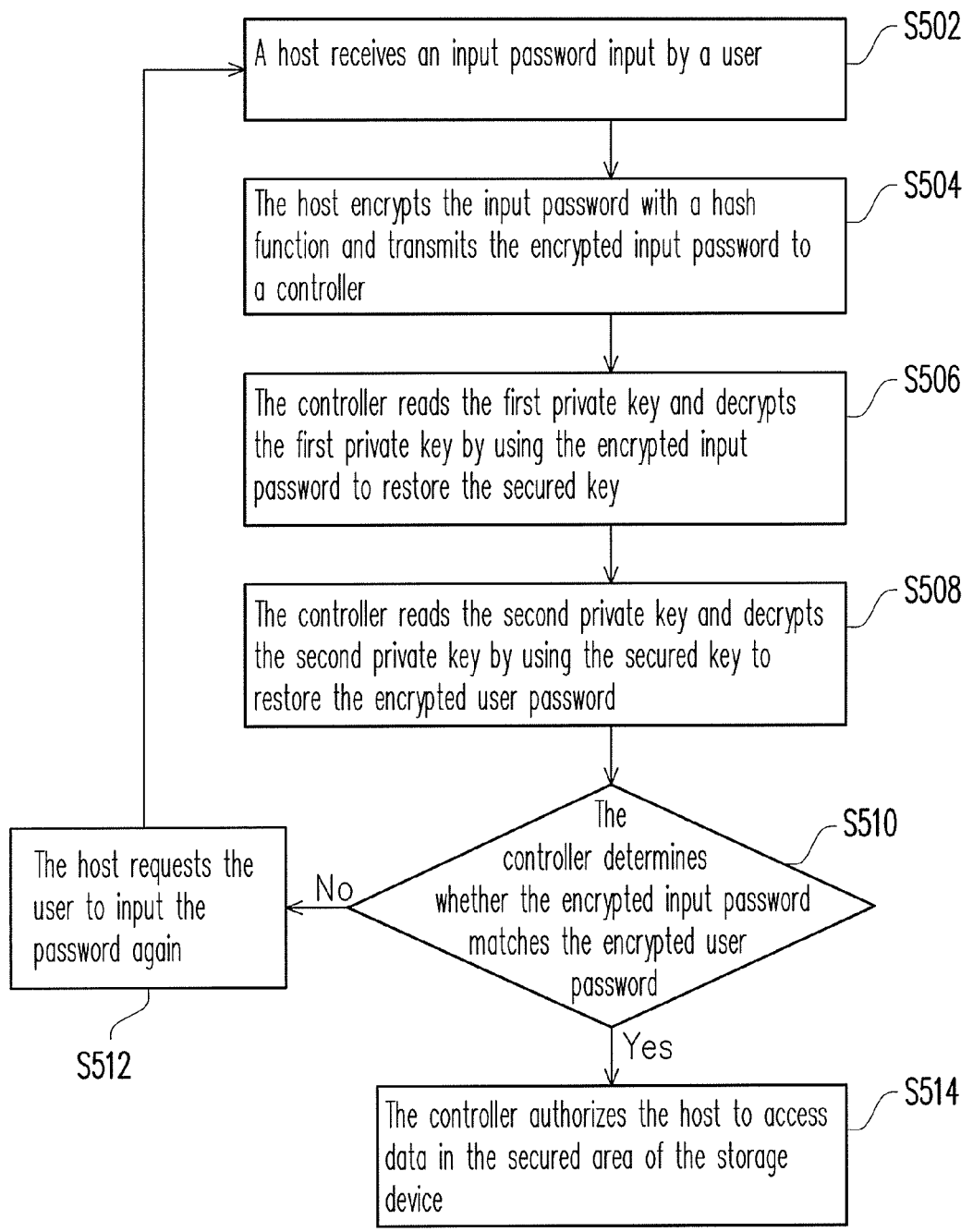
FIG. 5 is a flowchart of a secured data access method according to the second embodiment of the present invention.

According to an embodiment of the present invention, if the user is about to access the data in the storage device, the user has to input a password to be authenticated by the system. After the system authenticates the password input by the user, it authorizes the user to access the data. FIG. 5 is a flowchart of a secured data access method according to the second embodiment of the present invention. Referring to FIG. 5, in the present embodiment, when the user is about to access the data in the storage device, the secured key and the password in the storage device are restored through a crossly decryption mechanism, and the decrypted password is compared with the password input by the user to determine whether to authorize the user to access the data. Steps in this secured data access method will be described in detail below.

First, the host receives an input password input by the user (step S502), and the host encrypts the input password with a hash function and transmits the encrypted input password to the controller (step S504).

When the controller receives the encrypted input password, the controller reads the first private key from the secured area of the storage device and decrypts the first private key by using the encrypted input password to restore the secured key (step S506). In addition, the controller also reads the second private key from the secured area of the storage device and decrypts the second private key by using the secured key to restore the encrypted user password (step S508).

After that, the controller compares the encrypted input password with the encrypted user password to determine whether the encrypted input password matches the encrypted user password (step S510). If the encrypted input password does not match the encrypted user password, the host requests the user to input the password again (step S512), and the process returns to step S502. If the encrypted input password matches the encrypted user password, the controller authorizes the host to access the data in the secured area of the storage device (step S514). When the user is about to read data, the controller reads the data from the secured area of the storage device, decrypts the data by using the decrypted secured key, and transmits the decrypted data to the host to be inspected by the user. On the other hand, when the user is about to write data, the controller encrypts the data by using the secured key and then writes the encrypted data into the secured area of the storage device.

It should be mentioned that if the host has an exclusive device ID, the storage device may be designed to have a device ID corresponding to the device ID of the host. When the storage device is connected to the host, the host or the storage device first detects whether the device IDs thereof match each other. The host is allowed to access the storage device only if the device IDs match each other. To be specific, when a new storage device is connected to the host, the host first encrypts an exclusive device ID of the storage device with a hash function to obtain an encrypted device ID and then transmits the encrypted device ID to the storage device. When subsequently the storage device is connected to the host, the host or the storage device first obtains the encrypted device ID stored in the storage device, decrypts the encrypted device ID, and compares the decrypted device ID with the device ID of the host. The host is allowed to receive the input password input by the user only when the two device IDs match each other.

Third Embodiment

Figure 6:
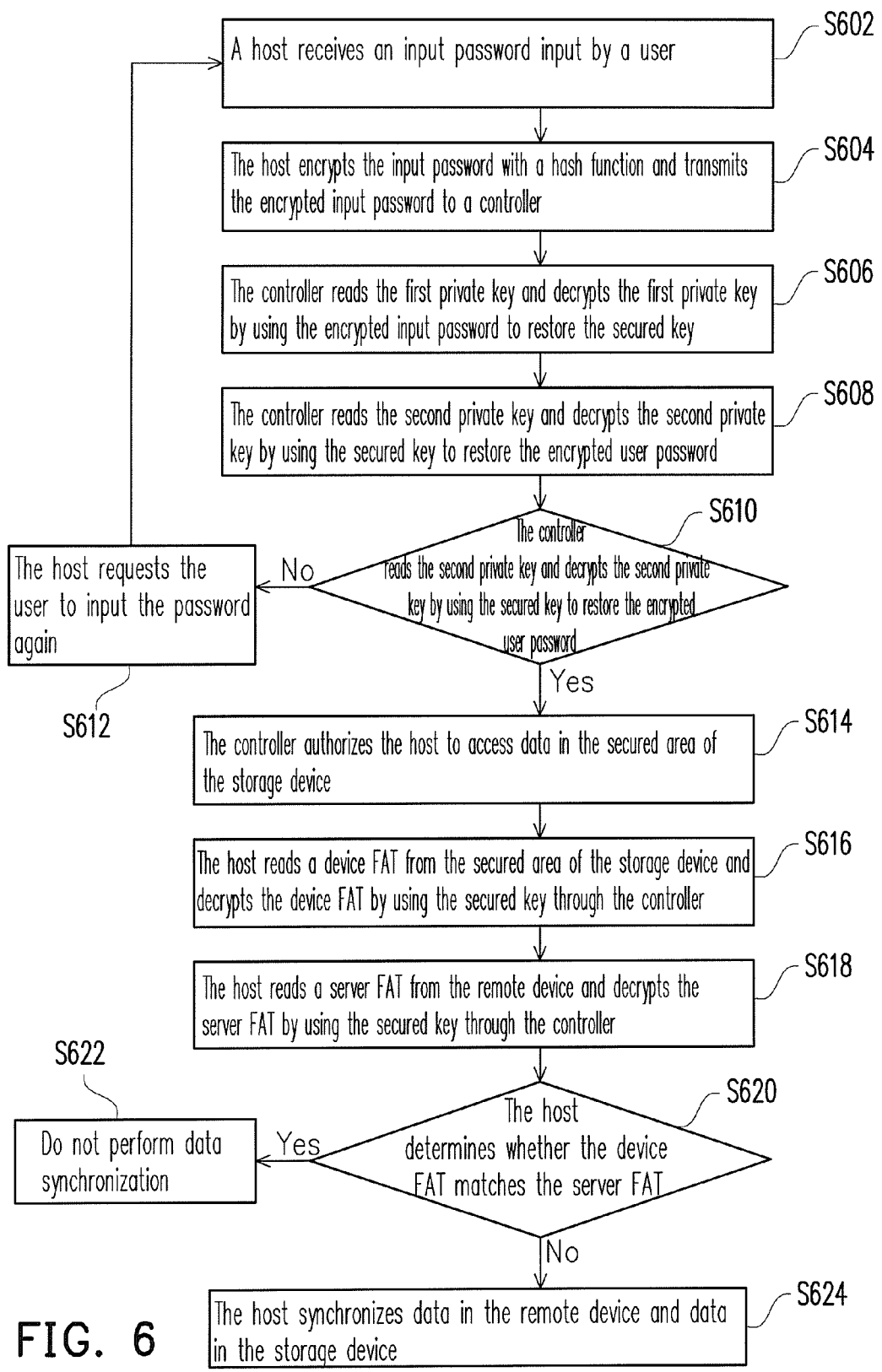
FIG. 6 is a flowchart of data synchronization method according to a third embodiment of the present invention.

In the third embodiment, the encrypted data and the crossly encrypted secured key and user password are transmitted to a remote device. When the data in the storage device is to be recovered, the data is copied from the remote device back to the storage device. FIG. 6 is a flowchart of data synchronization method according to the third embodiment of the present invention. Referring to FIG. 6, in the present embodiment, when the user connects the storage device to the host, the secured key and user password of the storage device are restored through a cross decryption mechanism, and the user password is compared with a password input by the user to determine whether to synchronize the data in the storage device and the data in the remote device. Steps in this data synchronization method will be described in detail below.

First, the host receives an input password input by the user (step S602), and the host encrypts the input password with a hash function and transmits the encrypted input password to the controller (step S604).

When the controller receives the encrypted input password, it reads the first private key from the secured area of the storage device and decrypts the first private key by using the encrypted input password to restore the secured key (step S606). In addition, the controller also reads the second private key from the secured area of the storage device and decrypts the second private key by using the secured key to restore the encrypted user password (step S608).

After that, the controller compares the encrypted input password with the encrypted user password to determine whether the encrypted input password matches the encrypted user password (step S610). If the encrypted input password does not match the encrypted user password, the host requests the user to input the password again (step S612), and the process returns to step S602. If the encrypted input password matches the encrypted user password, the controller authorizes the host to access the data in the secured area of the storage device (step S614).

After the host is authorized to access the data in the secured area, the host reads a device FAT from the secured area of the storage device and decrypts the device FAT by using the secured key through the controller (step S616). On the other hand, the host also reads a server FAT from the remote device and decrypts the server FAT by using the secured key through the controller (step S618).

After that, the host compares the decrypted device FAT with the decrypted server FAT to determine whether the two match each other (step S620). If the decrypted device FAT matches the server FAT, it is determined that the files therein are the same and no data synchronization is needed (step S622). If the decrypted device FAT does not match the decrypted server FAT, it is determined that the data in the remote device and the data in the storage device should be synchronized (step S624).

To be specific, the host may choose to copy the data from the storage device into the remote device according to a user's instruction. In this case, the host reads the data from the secured area of the storage device, encrypts the encrypted data by using a public key, and then transmits the data to the remote device. On the other hand, the host may also choose to copy the data from the remote device to the storage device according to the user's instruction. In this case, the host reads the encrypted data from the remote device, decrypts the encrypted data, and then stores the data into the secured area of the storage device.

In the present embodiment, since the data read from either device is encrypted and the data to be written into the other device is also encrypted while copying the data, data synchronization can be accomplished by simply copying blocks of data directly to the other device according to the device FAT without performing an encryption/decryption operation. In addition, if the storage device is used for data backup for the first time, the host copies the first private key and the second private key from the storage device into the remote device so that the backup data in the remote device can still be accessed even if the first private key and the second private key are lost along with the storage device.

It should be mentioned that besides foregoing method of transmitting the data into the remote device through the host, the operation may also be carried out through a kernel-based virtual machine (KVM), in which the user may directly input a password on the KVM to allow the KVM to authenticate the password. The encryption operation originally carried out by the host with the hash function can be carried out in the remote device.

Fourth Embodiment

Figure 7:
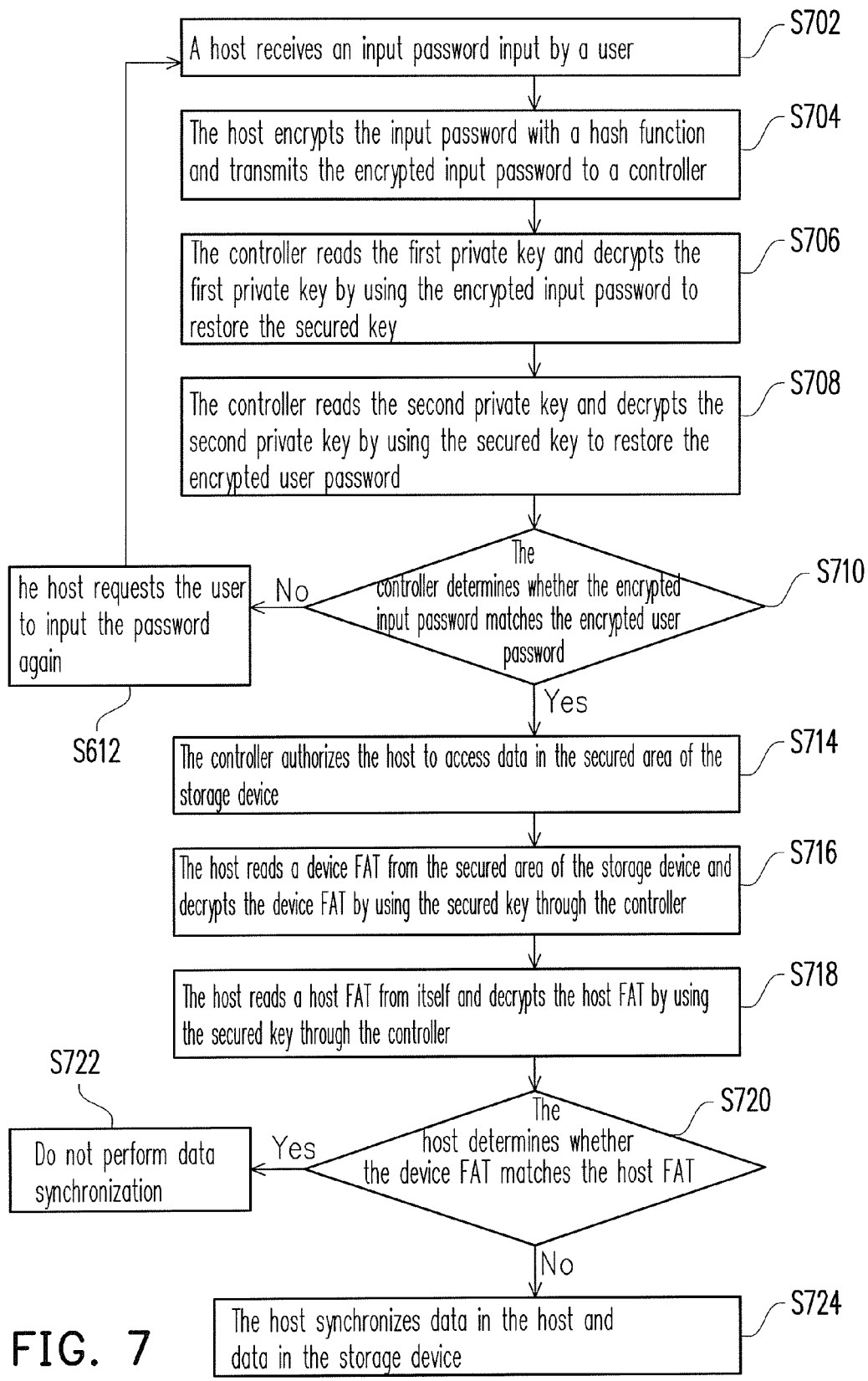
FIG. 7 is a flowchart of data synchronization method according to a fourth embodiment of the present invention.

In the fourth embodiment, the encrypted data and the crossly encrypted key and password are stored in a storage device of the host, and when the data in the storage device is to be recovered, the data is directly copied from the host back to the storage device. FIG. 7 is a flowchart of data synchronization method according to the fourth embodiment of the present invention. Referring to FIG. 7, in the present embodiment, when a user connects a storage device to a host, a secured key and a user password of the storage device are restored through a cross decryption mechanism to determine whether to synchronize data in the storage device and data in the host. Steps of the data synchronization method will be described in detail below.

First, the host receives a password input by the user (step S702) and then encrypts the input password with a hash function and transmits the encrypted input password to the controller (step S704).

After the controller receives the encrypted input password, the controller reads the first private key from the secured area of the storage device and decrypts the first private key by using the encrypted input password to restore the secured key (step S706). In addition, the controller also reads the second private key from the secured area of the storage device and decrypts the second private key by using the secured key to restore the encrypted user password (step S708).

Then, the controller compares the encrypted input password with the encrypted user password to determine whether the encrypted input password matches the encrypted user password (step S710). If the encrypted input password does not match the encrypted user password, the host requests the user to input the password again (step S712), and the process returns to step S702. If the encrypted input password matches the encrypted user password, the controller authorizes the host to access the data in the secured area of the storage device (step S714).

After being authorized to access the data in the secured area, the host reads a device FAT from the secured area of the storage device and decrypts the device FAT by using the secured key through the controller (step S716). On the other hand, the host also reads a host FAT from itself and decrypts the host FAT by using the secured key through the controller (step S718).

After that, the host compares the decrypted device FAT with the decrypted host FAT to determine whether the two match each other (step S720). If the decrypted device FAT matches the decrypted host FAT, it is determined that the files therein are the same and accordingly no data synchronization is needed (step S722). If the decrypted device FAT does not match the decrypted host FAT, then the data in the host and the data in the storage device should be synchronized (step S724).

To be specific, the host may choose to copy the data from the storage device to the host according to the user's instruction. In this case, the host reads the data from the secured area of the storage device and stores the data directly into the storage device. On the other hand, the host may also choose to copy the data from its own storage device (for example, a HDD) into an external storage device according to the user's instruction. In this case, the host reads the encrypted data from its own storage device and directly stores the encrypted data into the secured area of the storage device.

It should be mentioned herein that if the storage device is used for data backup for the first time, the host further copies the first private key and the second private key from the storage device into it's own storage device, so that the backup data in the storage device can still be accessed even if the first private key and the second private key are lost along with the storage device.

Fifth Embodiment

Through the secured data storage and recovery method described above, the encrypted data in the storage device and the crossly encrypted secured key and user password are respectively stored in the storage device, the host, or the remote device, so that when one or two of the devices are lost, the data can be recovered from the other device. Below, the situations that the storage device is lost, the host is lost, and both the storage device and the host are lost will be respectively described with reference to an embodiment of the present invention.

Figure 8:
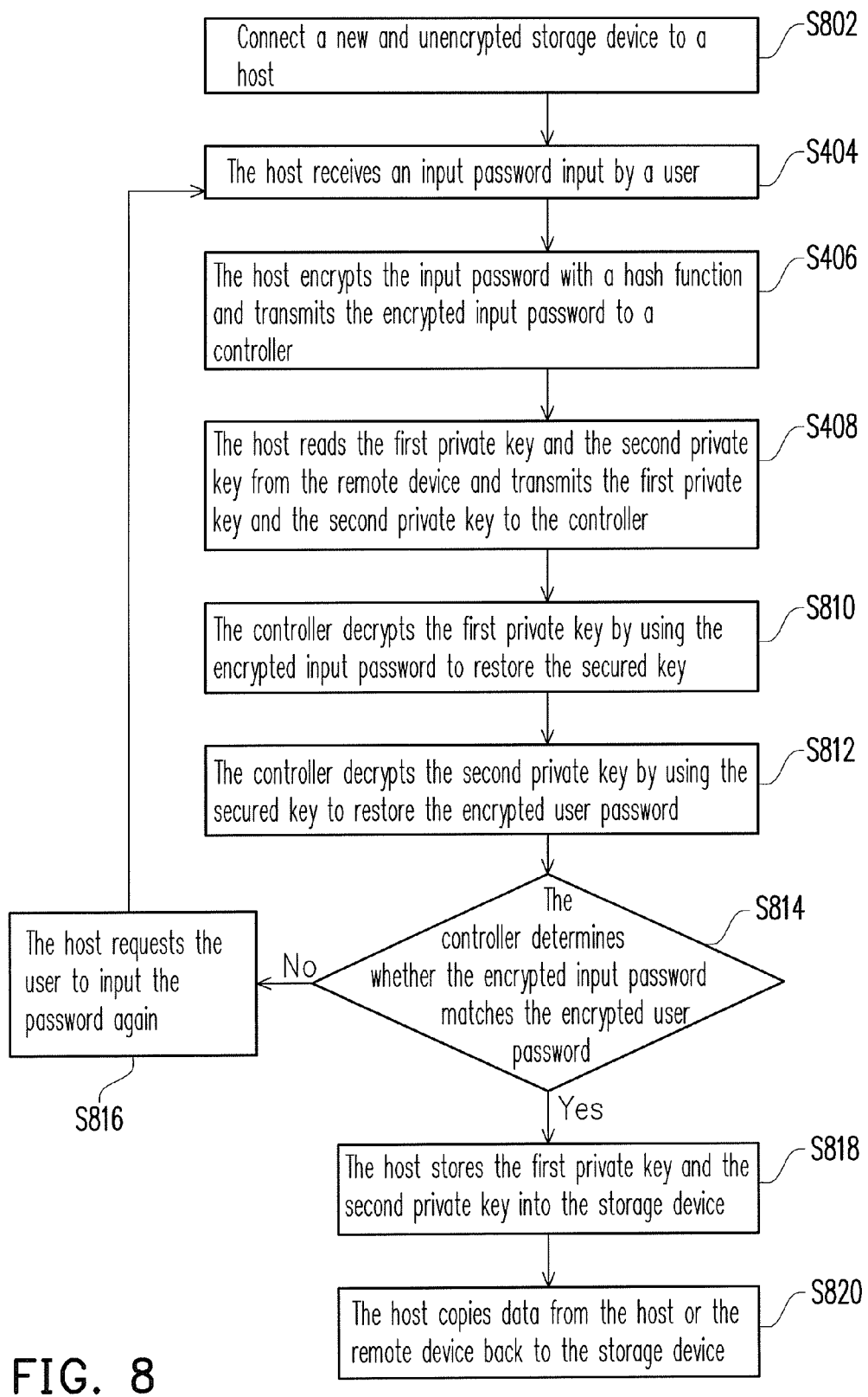
FIG. 8 is a flowchart of data recovery method according to a fifth embodiment of the present invention.

If the storage device is lost, a method for recovering data from the host or the remote device is provided in the present embodiment. FIG. 8 is a flowchart of data recovery method according to the fifth embodiment of the present invention. Referring to FIG. 8, in the present embodiment, when the storage device is lost, the encrypted secured key and the encrypted user password are read from the remote device and then decrypted, and the user password is then compared with a password input by the user. Once the password is authenticated, the data is copied from the host or the remote device back to the storage device. Steps in this data recovery method will be described in detail below.

First, a new and unencrypted storage device is connected to the host (step S802). Then, the host receives an input password input by a user (step S804), and then encrypts the input password with a hash function and transmits the encrypted input password to the controller (step S806).

Then, the host reads the first private key and the second private key from the remote device and transmits the first private key and the second private key to the controller (step S808). Once the controller receives the first private key and the second private key, the controller decrypts the first private key by using the encrypted input password to restore the secured key (step S810). In addition, the controller decrypts the second private key by using the secured key to restore the encrypted user password (step S812).

After that, the controller compares the encrypted input password with the encrypted user password to determine whether the encrypted input password matches the encrypted user password (step S814). If the encrypted input password does not match the encrypted user password, the host requests the user to input the password again (step S816), and the process returns to step S802. If the encrypted input password matches the encrypted user password, the host writes the first private key and the second private key into the storage device (step S818) and chooses to copy the data from the host or the remote device back to the storage device (step S820). The detailed content of the data recovery process has been described in foregoing embodiment therefore will not be described herein.

Figure 9:
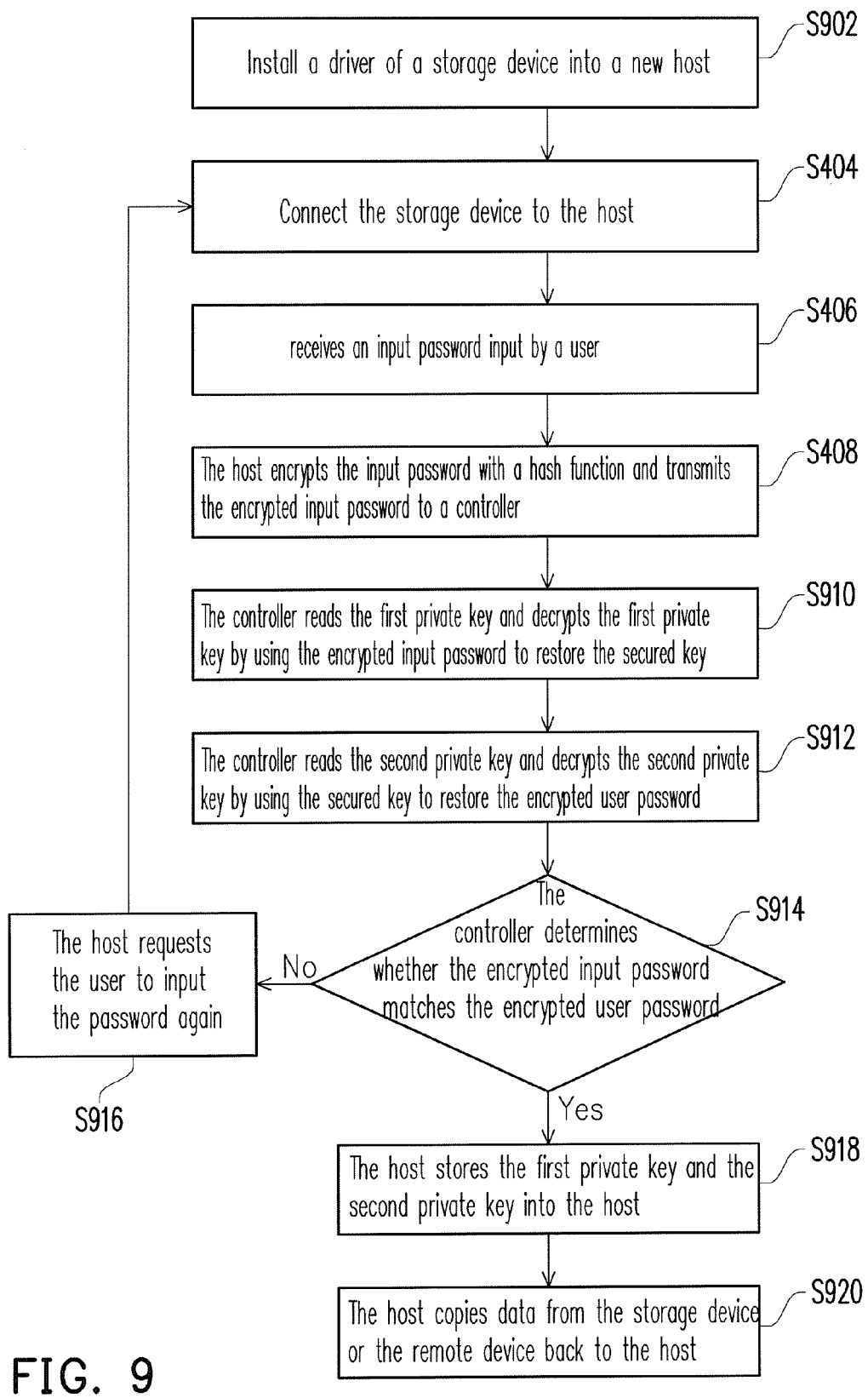
FIG. 9 is a flowchart of data recovery method according to a fifth embodiment of the present invention.

On the other hand, if the host is lost, a method for recovering the data from the storage device or the remote device is provided in the present embodiment. FIG. 9 is a flowchart of data recovery method according to the fifth embodiment of the present invention. Referring to FIG. 9, in the present embodiment, if the host is lost, the encrypted secured key and the encrypted user password are read from the storage device and decrypted, and the user password is then compared with a password input by the user. After that, the data is copied from the storage device or the remote device back to the storage device. The steps in this data recovery method will be described in detail below.

First, a driver of the storage device is installed into a new host (step S902), and then the storage device is connected to the host (step S904). Next, the host receives an input password input by a user (step S906), encrypts the input password with a hash function (step S908), and then transmits the encrypted input password to the controller (step S910).

Next, the controller reads the first private key and decrypts the first private key by using the encrypted input password to restore the secured key (step S912). In addition, the controller also reads the second private key and decrypts the second private key by using the secured key to restore the encrypted user password (step S914).

After that, the controller compares the encrypted input password with the encrypted user password to determine whether the encrypted input password matches the encrypted user password (step S916). If the encrypted input password does not match the encrypted user password, the host requests the user to input the password again (step S918), and the process returns to step S902. If the encrypted input password matches the encrypted user password, the host writes the first private key and the second private key into the host (step S920) and chooses to copy the data from the storage device or the remote device back into the host (step S922). The content of the data recovery process has been described in foregoing embodiment therefore will not be described herein.

The data can only be recovered from the remote device if both the host and the storage device are lost. Thus, besides providing a new host and a new storage device and connecting the two, the data has to be respectively recovered into the host and the storage device. The methods for recovering the data into the host and the storage device have been respectively described above therefore will not be described herein.

Through the data recovery methods described above, lost data can be recovered through the data synchronization between the storage device, the host, and the remote device. Accordingly, permanent data loss is avoided even if one of the devices is damaged or lost.

Sixth Embodiment

In the method and system of secured data storage and recovery described above, the security of data stored in the storage device, the host, or the remote device is enhanced by crossly encrypting the secured key and the user password. However, if the user forgets his user password, the user cannot access the data since he cannot pass the password authentication. Accordingly, in the present embodiment, a system password is further provided to resolve foregoing problem. The system password may be an ID or an independent PIN unlock key (PUK) of the storage device; however, the scope of the system password is not limited in the present embodiment.

Figure 10:
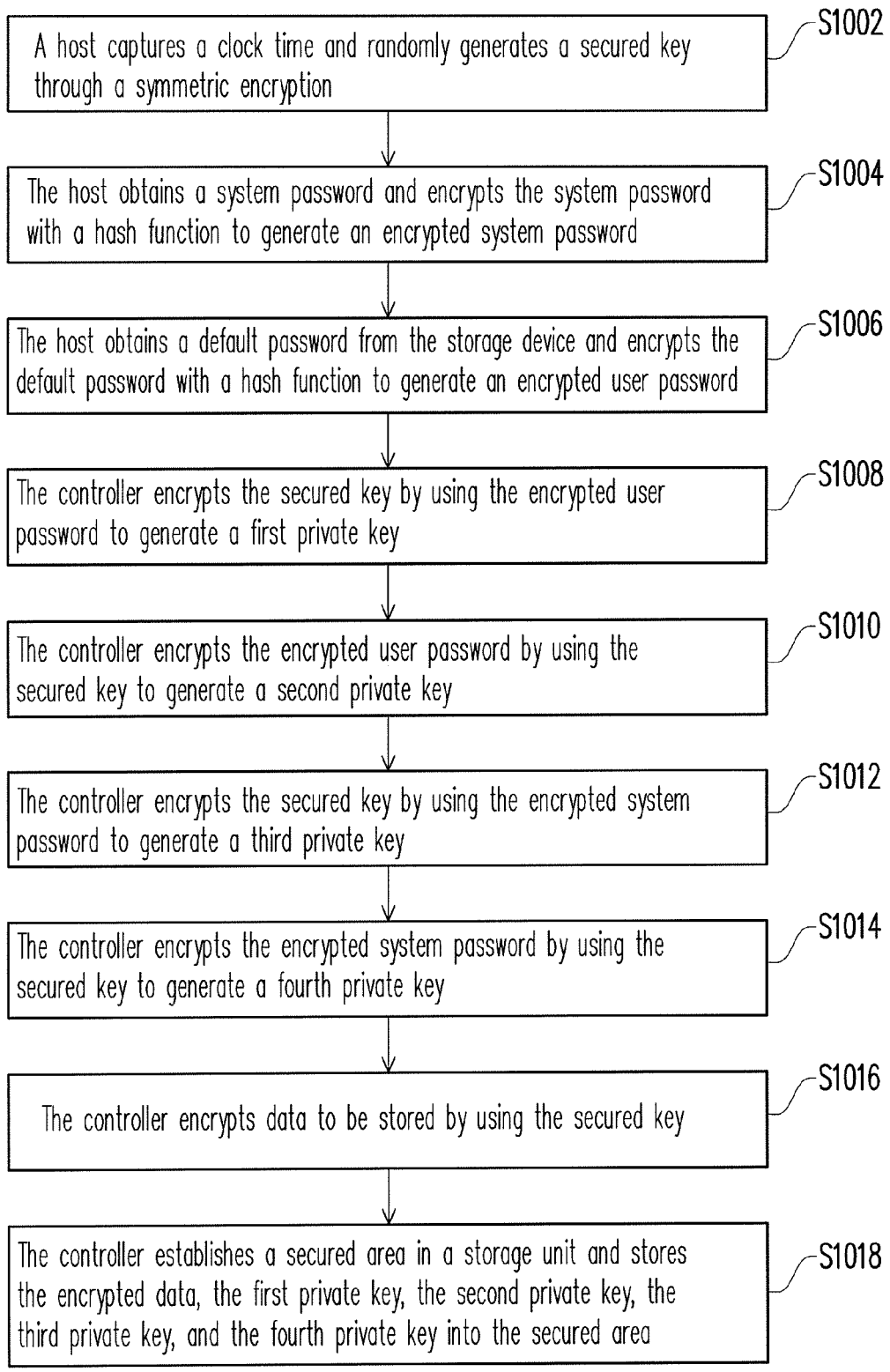
FIG. 10 is a flowchart of a secured data storage method according to a sixth embodiment of the present invention.

FIG. 10 is a flowchart of a secured data storage method according to the sixth embodiment of the present invention. Referring to FIG. 10, in the present embodiment, when the storage device is manufactured, a secured key and a default password of the storage device are crossly encrypted through a cross encryption mechanism, and the secured key and a system password of the storage device are respectively encrypted. Steps in the secured data storage method will be described in detail below.

First, the host captures a clock time and randomly generates a secured key through a symmetric encryption (step S1002). In addition, the host also encrypts a system password with a hash function to generate an encrypted system password (step S1004). On the other hand, the host obtains a default password of the storage device and encrypts the default password with the hash function to generate an encrypted user password (step S1006). The system password may be an ID or a PUK of the storage device.

Thereafter, the secured key, the encrypted user password, and the encrypted system password are transmitted to a controller of the storage device to be crossly encrypted. To be specific, the controller receives the encrypted user password and the secured key from the host and encrypts the secured key by using the encrypted user password to generate a first private key (step S1008), and meanwhile, the controller encrypts the encrypted user password by using the secured key to generate a second private key (step S1010).

On the other hand, after the controller receives the encrypted system password and the secured key from the host, the controller encrypts the secured key by using the encrypted system password to generate a third private key (step S1012), and meanwhile, the controller encrypts the encrypted system password by using the secured key to generate a fourth private key (step S1014). It should be mentioned herein that in an embodiment of the present invention, the controller further encrypts the encrypted user password by using the encrypted system password to provide advanced security and advanced protection.

In addition, the controller also encrypts data to be stored by using the secured key (step S1016) and establishes a secured area in the storage unit. The controller then stores the encrypted data, the first private key, the second private key, the third private key, and the fourth private key into the secured area of the storage device (step S1018).

Through the method described above, even though the user forgets his user password, the user can still use the system password of the storage device to pass the password authentication and accordingly access the data or reset the user password. This method will be further described below with reference to an embodiment of the present invention.

Figure 11:
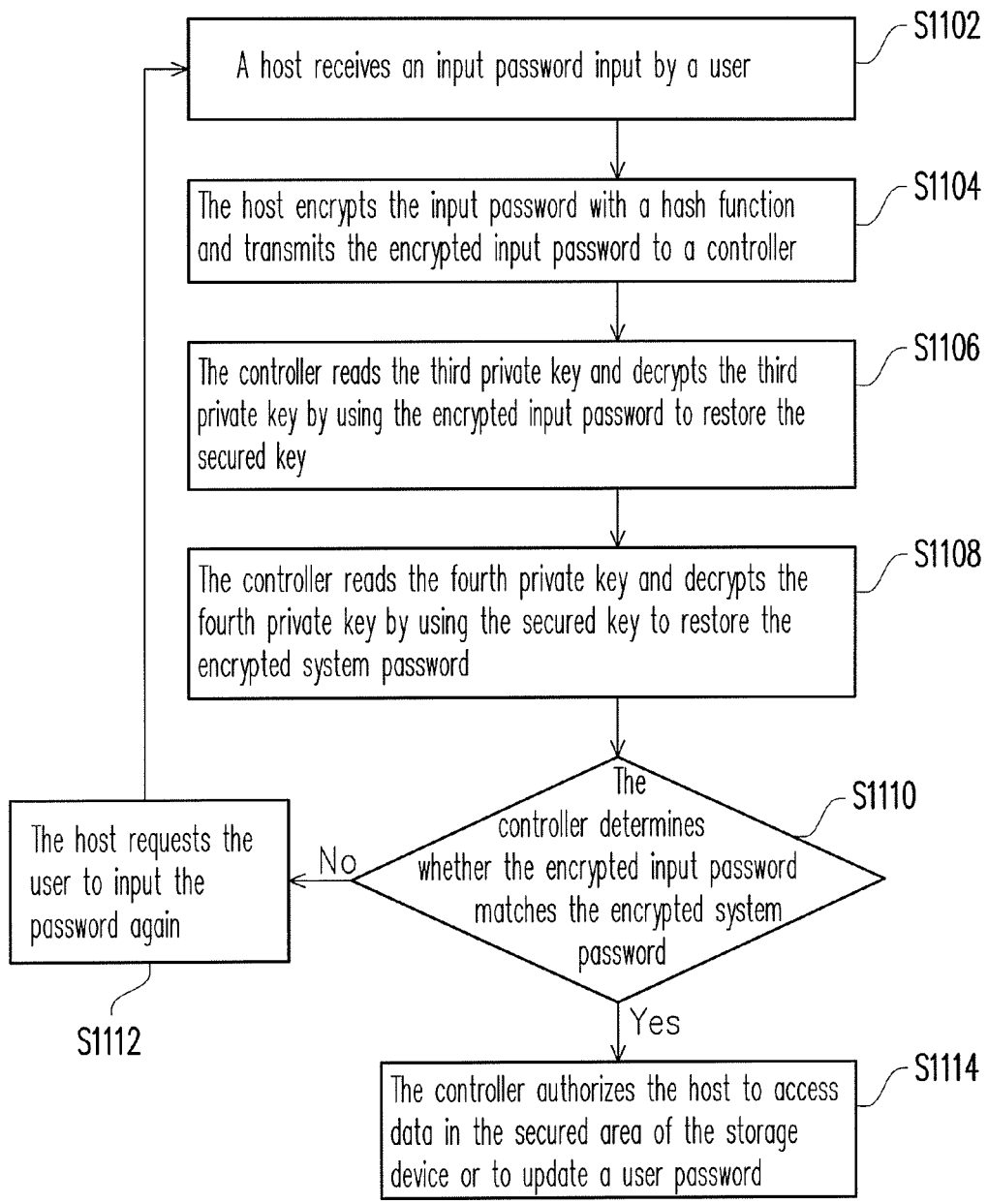
FIG. 11 is a flowchart of a secured data access method according to the sixth embodiment of the present invention.

FIG. 11 is a flowchart of a secured data access method according to the sixth embodiment of the present invention. Referring to FIG. 11, the present embodiment follows foregoing embodiment, in which when the user forgets his user password, the user can still use the system password to pass the password authentication and accordingly to access data or reset the user password. The steps in this secured data access method will be described in detail below.

First, the host receives an input password input by the user (step S1102) and then encrypts the input password with a hash function and transmits the encrypted input password to the controller (step S1104).

After the controller receives the encrypted input password, the controller reads the third private key from the secured area of the storage device and decrypts the third private key by using the encrypted input password to restore the secured key (step S1106). In addition, the controller also reads the fourth private key from the secured area of the storage device and decrypts the fourth private key by using the secured key to restore the encrypted system password (step S1108).

After that, the controller compares the encrypted input password with the encrypted system password to determine whether the encrypted input password matches the encrypted system password (step S1110). If the encrypted input password does not match the encrypted system password, the host requests the user to input the password again (step S1112), and the process returns to step S1102. If the encrypted input password matches the system password, the controller authorizes the host to access the data in the secured area of the storage device or to update the user password (step S1114). The processes for accessing the encrypted data and updating the user password have been described in foregoing embodiments therefore will not be described herein.

As described above, in the method and system of secured data storage and recovery provided by the present invention, data to be stored is encrypted by using a secured key, and stored into a remote device, a host, and a storage device together with a secured key and a user password which are crossly encrypted. Thus, data recovery mechanism is provided when any one of the devices is damaged or lost. As a result, permanent data loss is avoided. Moreover, the crossly encrypted secured key and user password help to enhance the security of data storage and to prevent the secured data from being misappropriated by unauthorized users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A secured data storage and recovery method, for encrypting data by using a controller of a storage device and transmitting the encrypted data to a remote device through a host, the secured data storage and recovery method comprising:

obtaining a secured key and an encrypted user password of the storage device wherein the secure key is randomly generated by the host;

encrypting the secured key by using the encrypted user password to generate a first private key;

encrypting the encrypted user password by using the secured key to generate a second private key;

encrypting data to be stored by using the secured key;

transmitting the encrypted data, the first private key, and the second private key to the remote device for storage through the host;

receiving an old password and a new password input by a user through the host;

encrypting the old password and the new password with a hash function and transmitting the encrypted old password and the encrypted new password to the controller through the host;

reading the first private key by decrypting the first private key using the encrypted old password to restore the secured key through the controller;

reading the second private key by decrypting the second private key using the secured key to restore the encrypted user password through the controller;

determining whether the encrypted old password matches the encrypted user password through the controller;

replacing the encrypted user password with the encrypted new password to encrypt the secured key in response to the encrypted old password matches the encrypted user password; and requesting the user to input a password by the host in response to the encrypted old password does not match the encrypted user password.

2. The secured data storage and recovery method according to claim 1, wherein the encrypted user password obtained by the controller is generated by one of the host and the remote device encrypting an original password with a hash function.

3. The secured data storage and recovery method according to claim 2, wherein the original password is a default password of the storage device or a password set by a user.

4. The secured data storage and recovery method according to claim 1, wherein the step of obtaining the secured key of the storage device comprises:

obtaining the secured key through the host, wherein the secured key is randomly generated by the host through a symmetric encryption.

5. The secured data storage and recovery method according to claim 1, wherein the step of transmitting the encrypted data, the first private key, and the second private key to the remote device for storage further comprises encrypting the encrypted data, the first private key, and the second private key by using a public key.

6. The secured data storage and recovery method according to claim 1, wherein after the step of encrypting the data by using the secured key, the secured data storage and recovery method further comprises:

storing the encrypted data, the first private key, and the second private key into a secured area of the storage device.

7. The secured data storage and recovery method according to claim 1, wherein the step of replacing the encrypted user password with the encrypted new password to encrypt the secured key comprises:

encrypting the secured key by using the encrypted new password to generate a new first private key;

encrypting the encrypted new password by using the secured key to generate a new second private key; and transmitting the new first private key and the new second private key to the remote device through the host.

8. The secured data storage and recovery method according to claim 7, wherein after the step of generating the new first private key and the new second private key, the secured data storage and recovery method further comprises:

storing the new first private key and the new second private key into the secured area of the storage device.

9. The secured data storage and recovery method according to claim 6, wherein after the step of storing the encrypted data, the first private key, and the second private key into the secured area of the storage device, the secured data storage and recovery method further comprises:

receiving an input password input by the user through the host;

encrypting the input password with a hash function and transmitting the encrypted input password to the controller through the host;

reading the first private key and decrypting the first private key by using the encrypted input password to restore the secured key through the controller;

reading the second private key and decrypting the second private key by using the secured key to restore the encrypted user password through the controller;

determining whether the encrypted input password matches the encrypted user password through the controller; and authorizing the host to access the data in the secured area of the storage device or the data in the remote device if the encrypted input password matches the encrypted user password.

10. The secured data storage and recovery method according to claim 9, wherein the controller reads the first private key and the second private key from the secured area of the storage device or from the remote device.

11. The secured data storage and recovery method according to claim 9 further comprising:

encrypting an exclusive device identification (ID) of the host with the hash function through the host to obtain an encrypted device ID; and transmitting the encrypted device ID to the storage device.

12. The secured data storage and recovery method according to claim 11, wherein before the step of receiving the input password input by the user through the host, the secured data storage and recovery method further comprises:

obtaining the encrypted device ID from the storage device; and decrypting the encrypted device ID and comparing the decrypted device ID with the device ID of the host through the host or the storage device, and allowing the host to receive the input password input by the user when the decrypted device ID matches the device ID of the host.

13. The secured data storage and recovery method according to claim 9, wherein after the step of authorizing the host to access the data in the secured area, the secured data storage and recovery method further comprises:

accessing an encrypted device file allocation table (FAT) from the secure area of the storage device through the host, and decrypting the encrypted device FAT by using the secured key through the controller;

accessing an encrypted server FAT from the remote device through the host, and decrypting the encrypted server FAT by using the secured key through the controller;

determining whether the decrypted device FAT matches the decrypted server FAT through the host; and synchronizing the data in the remote device and the data in the secured area of the storage device through the host if the decrypted device FAT does not match the decrypted server FAT.

14. The secured data storage and recovery method according to claim 13, wherein the step of synchronizing the data in the remote device and the data in the storage device through the host further comprises encrypting the transmitted data by using a public key.

15. The secured data storage and recovery method according to claim 13, wherein the step of synchronizing the data in the remote device and the data in the storage device through the host comprises copying the data from the remote device to the storage device or copying the data from the storage device to the remote device.

16. The secured data storage and recovery method according to claim 13, wherein the step of synchronizing the data in the remote device and the data in the storage device through the host comprises copying the first private key and the second private key to the remote device or to the secured area of the storage device.

17. The secured data storage and recovery method according to claim 1 further comprising:
- obtaining a system password of the storage device through the host;
- encrypting the system password with a hash function and transmitting the encrypted system password to the controller through the host;
- encrypting the secured key by using the encrypted system password through the controller to generate a third private key;
- encrypting the encrypted system password by using the secured key through the controller to generate a fourth private key; and
- storing the third private key and the fourth private key into the secured area of the storage device through the controller.

18. The secured data storage and recovery method according to claim 17, wherein the encrypted system password is further used for encrypting the encrypted user password.

19. The secured data storage and recovery method according to claim 17, wherein after the step of storing the third private key and the fourth private key into the secured area of the storage device through the controller, the secured data storage and recovery method further comprises:
- receiving an input password input by the user through the host;
- encrypting the input password with the hash function and transmitting the encrypted input password to the controller through the host;
- reading the third private key and decrypting the third private key by using the encrypted input password to restore the secured key through the controller;
- reading the fourth private key and decrypting the fourth private key by using the secured key to restore the encrypted system password through the controller;
- determining whether the encrypted input password matches the encrypted system password through the controller; and
- authorizing the host to access data in the secured area if the encrypted input password matches the encrypted system password.

20. The secured data storage and recovery method according to claim 17, wherein the system password comprises an ID or a PIN unlock key (PUK) of the storage device.

21. The secured data storage and recovery method according to claim 1, wherein the storage device comprises one of a U-disk, a NAND flash memory, a NOR flash memory, a solid state drive (SSD), and a hard disk drive (HDD).

22. The secured data storage and recovery method according to claim 1, wherein the host comprises one of a laptop, a desktop, a personal digital assistant (PDA), and a kernel-based virtual machine (KVM).

23. A secured data storage and recovery method, for encrypting data by using a controller of a storage device and storing the encrypted data into a host, the secured data storage and recovery method comprising:
- obtaining a secured key and an encrypted user password of the storage device wherein the secure key is randomly generated by the host;
- encrypting the secured key by using the encrypted user password to generate a first private key;
- encrypting the encrypted user password by using the secured key to generate a second private key;
- encrypting data to be stored by using the secured key;
- storing the encrypted data, the first private key, and the second private key into the host;
- receiving an old password and a new password input by a user through the encrypting the old password and the new password with a hash function and transmitting the encrypted old password and the encrypted new password to the controller through the host;
- reading the first private key by decrypting the first private key using the encrypted old password to restore the secured key through the controller;
- reading the second private key by decrypting the second private key using the secured key to restore the encrypted user password through the controller;
- determining whether the encrypted old password matches the encrypted user password through the controller;
- replacing the encrypted user password with the encrypted new password to encrypt the secured key in response to the encrypted old password matches the encrypted user password; and
- requesting the user to input a password by the host in response to the encrypted old password does not match the encrypted user password.

24. The secured data storage and recovery method according to claim 23, wherein the encrypted user password obtained by the controller is generated by the host encrypting an original password with a hash function.

25. The secured data storage and recovery method according to claim 24, wherein the original password is a default password of the storage device or a password set by a user.

26. The secured data storage and recovery method according to claim 24, wherein the step of obtaining the secured key of the storage device comprises:
- obtaining the secured key through the host, wherein the secured key is randomly generated by the host through a symmetric encryption.

27. The secured data storage and recovery method according to claim 23, wherein after the step of encrypting the data by using the secured key, the secured data storage and recovery method further comprises:
- storing the encrypted data, the first private key, and the second private key into a secured area of the storage device.

28. The secured data storage and recovery method according to claim 23, wherein the step of replacing the encrypted user password with the encrypted new password to encrypt the secured key comprises:
- encrypting the secured key by using the encrypted new password to generate a new first private key;
- encrypting the encrypted new password by using the secured key to generate a new second private key; and
- storing the new first private key and the new second private key into the host.

29. The secured data storage and recovery method according to claim 28, wherein after the step of generating the new first private key and the new second private key, the secured data storage and recovery method further comprises:
- storing the new first private key and the new second private key into the secured area of the storage device.

30. The secured data storage and recovery method according to claim 23, wherein after the step of storing the encrypted data, the first private key, and the second private key into the secured area of the storage device, the secured data storage and recovery method further comprises:
- receiving an input password input by the user through the host;
- encrypting the input password with the hash function and transmitting the encrypted input password to the controller through the host;

reading the first private key and decrypting the first private key by using the encrypted input password to restore the secured key through the controller;
reading the second private key and decrypting the second private key by using the secured key to restore the encrypted user password through the controller;
determining whether the encrypted input password matches the encrypted user password through the controller; and
authorizing the host to access the data in the secured area of the storage device or the data in the remote device if the encrypted input password matches the encrypted user password.

31. The secured data storage and recovery method according to claim 30, wherein the controller reads the first private key and the second private key from the secured area of the storage device or from the host.

32. The secured data storage and recovery method according to claim 30 further comprising:
encrypting an exclusive device identification (ID) of the host with the hash function through the host to obtain an encrypted device ID; and
transmitting the encrypted device ID to the storage device.

33. The secured data storage and recovery method according to claim 32, wherein before the step of receiving the input password input by the user through the host, the secured data storage and recovery method further comprising:
obtaining the encrypted device ID from the storage device; and
decrypting the encrypted device ID and comparing the decrypted device ID with the device ID of the host through the host or the storage device, and allowing the host to receive the input password input by the user if the decrypted device ID matches the device ID of the host.

34. The secured data storage and recovery method according to claim 30, wherein after the step of authorizing the host to access the data in the secured area, the secured data storage and recovery method further comprises:
reading a device file allocation table (FAT) from the secured area of the storage device through the host, and decrypting the device FAT by using the secured key through the controller;
reading a host FAT from the host, and decrypting the host FAT by using the secured key through the controller;
determining whether the decrypted device FAT matches the decrypted host FAT through the host; and
synchronizing the data in the host and the data in the secured area of the storage device through the host if the decrypted device FAT does not match the decrypted host FAT.

35. The secured data storage and recovery method according to claim 25, wherein the step of synchronizing the data in the host and the data in the storage device comprises copying the data from the host to the storage device or copying the data from the storage device to the host.

36. The secured data storage and recovery method according to claim 25, wherein the step of synchronizing the data in the host and the data in the storage device comprises copying the first private key and the second private key to the host or to the secured area of the storage device.

37. The secured data storage and recovery method according to claim 23, wherein the storage device comprises one of a U-disk, a NAND flash memory, a NOR flash memory, a solid state drive (SSD), and a hard disk drive (HDD).

38. The secured data storage and recovery method according to claim 23, wherein the host comprises one of a laptop, a desktop, and a kernel-based virtual machine (KVM).

39. A secured data storage and recovery method, for encrypting data by using a controller of a storage device and transmitting the encrypted data to a remote device through a host, the secured data storage and recovery method comprising:
obtaining a secured key and an encrypted user password of the storage device wherein the secure key is randomly generated by the host;
encrypting the secured key by using the encrypted user password to generate a first private key;
encrypting the encrypted user password by using the secured key to generate a second private key;
encrypting data to be stored by using the secured key;
storing the encrypted data, the first private key, and the second private key into a secured area of the storage device;
receiving an old password and a new password input by a user through the host;
encrypting the old password and the new password with a hash function and transmitting the encrypted old password and the encrypted new password to the controller through the host;
reading the first private key by decrypting the first private key using the encrypted old password to restore the secured key through the controller;
reading the second private key by decrypting the second private key using the secured key to restore the encrypted user password through the controller;
determining whether the encrypted old password matches the encrypted user password through the controller;
replacing the encrypted user password with the encrypted new password to encrypt the secured key in response to the encrypted old password matches the encrypted user password; and
requesting the user to input a password by the host in response to the encrypted old password does not match the encrypted user password.

40. The secured data storage and recovery method according to claim 39, wherein the encrypted user password obtained by the controller is generated by the host by encrypting an original password with a hash function.

41. The secured data storage and recovery method according to claim 40, wherein the original password is a default password of the storage device or a password set by a user.

42. The secured data storage and recovery method according to claim 39, wherein the step of obtaining the secured key of the storage device comprises:
obtaining the secured key through the host, wherein the secured key is randomly generated by the host through a symmetric encryption.

43. The secured data storage and recovery method according to claim 39, wherein the step of replacing the encrypted user password with the encrypted new password to encrypt the secured key comprises:
encrypting the secured key by using the encrypted new password to generate a new first private key;
encrypting the encrypted new password by using the secured key to generate a new second private key; and
storing the new first private key and the new second private key into the secured area of the storage device.

44. The secured data storage and recovery method according to claim 39, wherein after the step of storing the encrypted data, the first private key, and the second private key into the secured area of the storage device, the secured data storage and recovery method further comprises:
receiving an input password input by the user through the host;

encrypting the input password by using the hash function and transmitting the encrypted input password to the controller through the host;

reading the first private key from the secured area of the storage device and decrypting the first private key by using the encrypted input password to restore the secured key through the controller;

reading the second private key from the secured area of the storage device and decrypting the second private key by using the secured key to restore the encrypted user password through the controller;

determining whether the encrypted input password matches the encrypted user password through the controller; and authorizing the host to access the data in the secured area of the storage device or the data in the remote device if the encrypted input password matches the encrypted user password.

45. The secured data storage and recovery method according to claim 44 further comprising:

encrypting an exclusive device identification (ID) of the host with the hash function through the host to obtain an encrypted device ID; and transmitting the encrypted device ID to the storage device.

46. The secured data storage and recovery method according to claim 45, wherein before the step of receiving the input password input by the user through the host, the secured data storage and recovery method further comprises:

obtaining the encrypted device ID from the storage device; and decrypting the encrypted device ID and comparing the decrypted device ID with the device ID of the host through the host or the storage device, and allowing the host to receive the input password input by the user when the decrypted device ID matches the device ID of the host.

47. The secured data storage and recovery method according to claim 39, wherein the storage device comprises one of a U-disk, a NAND flash memory, a NOR flash memory, a solid state drive (SSD), and a hard disk drive (HDD).

48. The secured data storage and recovery method according to claim 39, wherein the host comprises one of a laptop, a desktop, and a kernel-based virtual machine (KVM).

49. A secured data storage and recovery system, comprising:

a remote device;

a host, connected to the remote device via a network, for encrypting an original password with a hash function to generate an encrypted user password; and a storage device, connected to the host, comprising:

a controller for:

receiving the encrypted user password through the host and obtaining a secured key, wherein the secure key is randomly generated by the host;

encrypting the secured key by using the encrypted user password to generate a first private key;

encrypting the encrypted user password by using the secured key to generate a second private key, encrypting data by using the secured key; and transmitting the encrypted data, the first private key, and the second private key to the remote device through the host;

a storage unit for storing the encrypted data, the first private key, and the second private key;

the controller further configured to:

read the first private key;

decrypt the first private key by using the encrypted old password to restore the secured key;

read the second private key;

decrypt the second private key by using the secured key to restore the encrypted user password;

determine whether the encrypted old password matches the encrypted user password through the controller;

replace the encrypted user password with the encrypted new password to encrypt the secured key in response to the encrypted old password matches the encrypted user password; and request the user to input a password by the host in response to the encrypted old password does not match the encrypted user password.

50. The secured data storage and recovery system according to claim 49, wherein the original password is a default password of the storage device or a password set by a user.

51. The secured data storage and recovery system according to claim 49, wherein the host randomly generates the secured key through a symmetric encryption.

52. The secured data storage and recovery system according to claim 49, wherein the host further encrypts the encrypted data, the first private key, and the second private key by using a public key when the host transmits the encrypted data, the first private key, and the second private key to the remote device through the host.

53. The secured data storage and recovery system according to claim 49, wherein the host further receives an old password and a new password input by the user, encrypts the old password and the new password with the hash function, and transmits the encrypted old password and the encrypted new password to the controller.

54. The secured data storage and recovery system according to claim 49, wherein the controller encrypts the secured key by using the encrypted new password to generate a new first private key, and the controller encrypts the encrypted new password by using the secured key to generate a new second private key, and the controller transmits the new first private key and the new second private key to the remote device through the host.

55. The secured data storage and recovery system according to claim 49, wherein the controller further stores the new first private key and the new second private key into the storage unit.

56. The secured data storage and recovery system according to claim 49, wherein the host further receives an input password input by a user, encrypts the input password with the hash function, and transmits the encrypted input password to the controller.

57. The secured data storage and recovery system according to claim 49, wherein the controller further reads the first private key and decrypts the first private key by using the encrypted input password to restore the secured key, and the controller further reads the second private key and decrypts the second private key by using the secured key to restore the encrypted user password, and the controller determines whether the encrypted input password matches the encrypted user password and authorizes the host to access the data in the storage unit of the storage device or the data in the remote device when the encrypted input password matches the encrypted user password.

58. The secured data storage and recovery system according to claim 57, wherein the controller reads the first private key and the second private key from the storage unit of the storage device or from the remote device.

59. The secured data storage and recovery system according to claim 57, wherein after the host is authorized to access the data in the storage unit, the host further configure to:
- access an encrypted device file allocation table (FAT) from the storage unit of the storage device and decrypts the encrypted device FAT by using the secured key through the controller;
- access an encrypted server FAT from the remote device and decrypts the encrypted server FAT by using the secured key through the controller;
- determine whether the decrypted device FAT matches the decrypted server FAT; and
- synchronize the data in the remote device and the data in the storage unit of the storage device when the decrypted device FAT does not match the decrypted server FAT.

60. The secured data storage and recovery system according to claim 59, wherein the host further encrypts the transmitted data by using a public key when the host synchronizes the data in the remote device and the data in the storage device.

61. The secured data storage and recovery system according to claim 59, wherein when the host synchronizes the data in the remote device and the data in the storage device, the host copies the data from the remote device to the storage device or copies data from the storage device to the remote device.

62. The secured data storage and recovery system according to claim 59, wherein when the host synchronizes the data in the remote device and the data in the storage device, the host copies the first private key and the second private key into the remote device or into the storage unit of the storage device.

63. The secured data storage and recovery system according to claim 49, wherein the host further obtains a system password of the storage device, encrypts the system password with the hash function, and transmits the encrypted system password to the controller.

64. The secured data storage and recovery system according to claim 63, wherein the controller further encrypts the secured key by using the encrypted system password to generate a third private key, encrypts the encrypted system password by using the secured key to generate a fourth private key, and stores the third private key and the fourth private key into the storage unit of the storage device.

65. The secured data storage and recovery system according to claim 64, wherein the controller further encrypts the encrypted user password by using the encrypted system password.

66. The secured data storage and recovery system according to claim 64, wherein the controller further reads the third private key and decrypts the third private key by using the encrypted input password to restore the secured key, and the controller further reads the fourth private key and decrypts the fourth private key by using the secured key to restore the encrypted system password, and the controller determines whether the encrypted input password matches the encrypted system password and authorizes the host to access the data in the storage unit when the encrypted input password matches the encrypted system password.

67. The secured data storage and recovery system according to claim 63, wherein the system password comprises an identification (ID) or a unlock key (PUK) of the storage device.

68. The secured data storage and recovery system according to claim 49, wherein the storage device comprises one of a U-disk, a NAND flash memory, a NOR flash memory, a solid state drive (SSD), and a hard disk drive (HDD).

69. The secured data storage and recovery system according to claim 49, wherein the host comprises one of a laptop, a desktop, a personal digital assistant (PDA), and a kernel-based virtual machine (KVM).

* * * * *